United States Patent
Song et al.

(10) Patent No.: US 11,056,901 B2
(45) Date of Patent: Jul. 6, 2021

(54) METHOD FOR CHARGING SECONDARY BATTERY USING MULTIPLE CHARGING SECTIONS

(71) Applicant: LG CHEM, LTD., Seoul (KR)

(72) Inventors: Jun Hyuk Song, Daejeon (KR); Joo Sung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 246 days.

(21) Appl. No.: 16/339,549

(22) PCT Filed: Mar. 9, 2018

(86) PCT No.: PCT/KR2018/002799
§ 371 (c)(1),
(2) Date: Apr. 4, 2019

(87) PCT Pub. No.: WO2018/164523
PCT Pub. Date: Sep. 13, 2018

(65) Prior Publication Data
US 2019/0237975 A1    Aug. 1, 2019

(30) Foreign Application Priority Data

Mar. 10, 2017 (KR) ........................ 10-2017-0030314

(51) Int. Cl.
*H02J 7/00* (2006.01)
*H01M 10/0525* (2010.01)
(Continued)

(52) U.S. Cl.
CPC ............. *H02J 7/007* (2013.01); *H01M 4/587* (2013.01); *H01M 10/0525* (2013.01);
(Continued)

(58) Field of Classification Search
CPC .. H02J 7/007; H02J 7/00; H02J 7/0071; H02J 7/04; H01M 10/0525; H01M 10/44; H01M 4/587; H01M 2004/027; Y02E 60/10
See application file for complete search history.

(56) References Cited

U.S. PATENT DOCUMENTS 5,994,878 A    11/1999  Ostergaard et al.
6,818,354 B2 *  11/2004  Saisho ............. H01M 10/0525
                                                    429/247
(Continued)

FOREIGN PATENT DOCUMENTS

CN    101071887 A     11/2007
EP    3 358 704 A1    11/2007
(Continued)

OTHER PUBLICATIONS

International Search Report for PCT/KR2018/002799 (PCT/ISA/210) dated Jul. 4, 2018.

*Primary Examiner* — Naum Levin
(74) *Attorney, Agent, or Firm* — Birch, Stewart, Kolasch & Birch, LLP

(57) ABSTRACT

A method of charging a secondary battery, including first, second and third charging sections in which a CC-charging performed as first, second, and third Crate (C1, C2, C3), respectively, is supplied until the voltage of the secondary battery reaches a respective first, second and third charging cutoff voltage (V1), (V2), (V3) and a CV-charging is performed as the respective charging C-rate gradually decreases in response to reaching the respective charging cutoff voltage (V1), (V2), (V3), wherein the charging cutoff voltage satisfies the V1=n−(0.25~0.15), V2 n−(0.2~0.1), and V3=n (here, 'n' is an electric potential at the full charge of the secondary battery), and V1<V2<V3.

20 Claims, 7 Drawing Sheets

(51) Int. Cl.
*H01M 10/44* (2006.01)
*H01M 4/587* (2010.01)
*H01M 4/02* (2006.01)

(52) U.S. Cl.
CPC .............. *H01M 10/44* (2013.01); *H02J 7/00* (2013.01); *H01M 2004/027* (2013.01)

(56) References Cited

U.S. PATENT DOCUMENTS

| | | | | |
|---|---|---|---|---|
| 6,916,579 B2 * | 7/2005 | Gorchkov | ............ | H01M 4/485 429/231.1 |
| 7,745,057 B2 * | 6/2010 | Abe | ............ | H01M 4/131 429/330 |
| 8,003,250 B2 * | 8/2011 | Chiang | ............ | H01M 4/38 429/209 |
| 8,013,577 B2 * | 9/2011 | Nishino | ............ | H01M 10/441 320/162 |
| 8,021,782 B2 * | 9/2011 | Miyazaki | ............ | H01M 4/505 429/223 |
| 8,030,902 B2 * | 10/2011 | Kung | ............ | H02J 7/0022 320/160 |
| 8,329,340 B2 * | 12/2012 | Mori | ............ | H01M 4/366 429/231.4 |
| 8,420,262 B2 * | 4/2013 | Takami | ............ | H01M 4/362 429/224 |
| 8,497,040 B2 * | 7/2013 | Chung | ............ | H01M 4/131 429/231.95 |
| 8,617,745 B2 * | 12/2013 | Gozdz | ............ | H01M 10/0569 429/231.9 |
| 8,643,342 B2 | 2/2014 | Mehta et al. | | |
| 8,911,893 B2 * | 12/2014 | Suppes | ............ | H01G 11/32 429/105 |
| 8,912,762 B2 * | 12/2014 | Suzuki | ............ | H02J 7/0071 320/160 |
| 8,993,159 B2 * | 3/2015 | Chiang | ............ | H01M 8/20 429/209 |
| 9,368,995 B2 | 6/2016 | Nishino et al. | | |
| 9,490,499 B2 * | 11/2016 | Kawai | ............ | H01M 4/583 |
| 9,496,584 B2 * | 11/2016 | Taguchi | ............ | H01M 4/80 |
| 9,509,162 B2 * | 11/2016 | Carpenter, Jr. | ............ | H02J 7/007 |
| 9,735,423 B2 * | 8/2017 | Abe | ............ | H01M 4/137 |
| 9,893,377 B2 * | 2/2018 | Ishii | ............ | B60L 58/14 |
| 9,917,458 B2 * | 3/2018 | Lee | ............ | H02J 7/00711 |
| 10,236,493 B2 | 3/2019 | Eaglesham et al. | | |
| 10,605,870 B2 * | 3/2020 | Kim | ............ | H02J 7/045 |
| 2008/0081258 A1 * | 4/2008 | Kim | ............ | C04B 35/62884 429/209 |
| 2009/0273320 A1 | 11/2009 | Ungar et al. | | |
| 2010/0207583 A1 * | 8/2010 | Tanaka | ............ | H01M 4/525 320/134 |
| 2011/0037438 A1 | 2/2011 | Bhardwaj et al. | | |
| 2011/0037439 A1 | 2/2011 | Bhardwaj et al. | | |
| 2012/0027926 A1 * | 2/2012 | Miyuki | ............ | H01M 4/36 427/78 |
| 2012/0121988 A1 * | 5/2012 | Lee | ............ | H01M 4/133 429/231.8 |
| 2014/0077815 A1 | 3/2014 | Mattisson et al. | | |
| 2014/0266068 A1 * | 9/2014 | O'Brien | ............ | B60L 53/11 320/139 |
| 2015/0022160 A1 * | 1/2015 | Greening | ............ | H02J 7/0077 320/162 |
| 2015/0123621 A1 | 5/2015 | Kim et al. | | |
| 2015/0340885 A1 | 11/2015 | Baek et al. | | |
| 2016/0064967 A1 | 3/2016 | Lee et al. | | |
| 2017/0288417 A1 * | 10/2017 | Trichy | ............ | H02J 7/35 |
| 2017/0338667 A1 | 11/2017 | Loonen et al. | | |
| 2020/0274148 A1 * | 8/2020 | Xiao | ............ | H01M 4/134 |

FOREIGN PATENT DOCUMENTS

| | | |
|---|---|---|
| JP | 11-97074 A | 4/1999 |
| JP | 5810320 B2 | 11/2015 |
| KR | 10-2011-0024707 A | 3/2011 |
| KR | 10-2013-0137560 A | 12/2013 |
| KR | 10-1476913 B1 | 12/2014 |
| KR | 10-1494166 B1 | 2/2015 |
| KR | 10-2015-0133587 A | 11/2015 |
| KR | 10-2016-0024589 A | 3/2016 |
| KR | 10-2017-0026533 A | 3/2017 |

* cited by examiner

METHOD FOR CHARGING SECONDARY BATTERY USING MULTIPLE CHARGING SECTIONS

TECHNICAL FIELD

The present invention relates to a method of charging a secondary battery, and more particularly, to a method for charging a secondary battery in which CC-CV charging is performed three times at a specific rate.

RELATED ART

As technologies of mobile devices such as a portable terminal, a mobile phone, and a camera are developed and the demand for the mobile devices increases, the demand for secondary batteries as energy sources has rapidly increased. Among such secondary batteries, a lithium ion battery with a high energy density and operating potential, a long cycle lifespan and a low self-discharge rate has been commercialized and widely used.

Such a secondary battery can be recharged and be used continually after discharging. As a result, the performance is different depending on a charge/discharge state, and thus efforts have been made to improve the performance of the secondary battery by improving the charging method.

FIG. 1 is a view showing a constant current mode-constant voltage mode charging method (hereinafter, referred to as a CCCV charging method) generally used as a method of charging the secondary battery. As shown in FIG. 1, the CC-CV charging method is a method in which charging is performed at a maximum current until reaching a constant battery voltage, and when reaching the constant battery voltage, charging is performed while gradually reducing the charge current.

However, as described above, the constant current charging section maintains the constant current for about one hour in the constant current charging at a low 0.5C rate or less, so that the constant voltage charging section (step 2) is relatively long, and the C-rate and the time are directly proportional to each other in the conventional CC-CV charging method because the termination of charging is controlled by sensing time or current.

In the case of charging using the conventional method as described above, the charging rate is about 85% or less for 100 minutes of charging, and more than 130 minutes is necessary for charging at least 90% or more. Likewise, it takes a long time to charge the battery.

Accordingly, a charging method capable of more precise full charging and capable of charging at a faster charging speed than that of the conventional charging method has been researched.

Specifically, in order to improve the charging speed in the conventional charging method, the C-rate in the CC charging section is set to be large. However, in this case, due to the overpotential of the negative electrode, formation of lithium dendrites and the like have resulted in a limitation in the rapid charging beyond a specific charging state, the amount of heat generated by the secondary battery increases, and the deterioration of the battery progresses rapidly, thereby causing the rapid deterioration of the battery performance.

Particularly, the graphite-based negative electrode is charged by a unique lithium insertion mechanism. When the negative electrode potential is lowered below a specific potential by charging in a manner that does not take into account the difference in resistance between the negative electrodes, lithium dendrites are formed.

In order to solve such a problem, Korean Patent Laid-Open Publication Nos. 2015-0133587 and 10-1494156 adopt a configuration in which a stepwise change is made in the C-rate characteristic at the time of charging, thereby increasing the amount of charge per unit hour.

However, the methods disclosed in these documents are all different, and the application effects are also very different from each other. In particular, in the secondary battery to which graphite is applied, despite the step-like charging as described above, as the resistances are different by sections, a section where the flatness of the negative electrode charging potential is still low and the potential is lowered to the potential of the negative electrode where lithium dendrite is formed upon charging exists. As such, there is still a difference in the rate of degeneration per cycle during the cycle progress, thereby affecting the lifetime characteristics.

Therefore, there is a need for an improved charging method capable of charging in a short period of time while minimizing overvoltage of a negative electrode, thereby improving the flatness of the negative electrode charging potential during charging and lowering the deterioration rate of the battery.

DISCLOSURE

Technical Problem

Accordingly, the present invention has been made to solve the above-mentioned problems of the prior art and the technical problems required from the past.

The inventors of the present application have conducted intensive research and various experiments, and have found that, in the stepwise charging method, when the charging C-rate for each section satisfies a specific ratio, and the cut-off voltage for each section is appropriately selected for the battery charge, the deterioration of the battery can be effectively prevented, compared with the one-step CC-CV charging method for satisfying the target charging time, or the conventional step-by-step charging method and completed the present invention.

Technical Solution

Hence, according to the charging method of a secondary battery according to the present invention, there are charging sections by preset C-rates, and a constant current-constant voltage (CC-CV) charging is performed in each of the charging sections, in which the charging section includes:

a first charging section in which a CC-charging is performed as a first C-rate (C1) is supplied until the voltage of the secondary battery reaches a first charging cutoff voltage (V1), and a CV-charging is performed as the charging C-rate gradually decreases in response to reaching the first charging cutoff voltage (V1);

a second charging section in which a CC-charging is performed as a second C-rate (C2) is supplied until the voltage of the secondary battery reaches a second charging cutoff voltage (V2), and a CV-charging is performed as the charging C-rate gradually decreases in response to reaching the second charging cutoff voltage (V2); and a third charging section in which a CC-charging is performed as a third C-rate (C3) is supplied until the voltage of the secondary battery reaches a third charging cutoff voltage (V3), and a CV-charging is performed as the charging C-rate gradually decreases in response to reaching the third charging cutoff voltage (V3), the charging cutoff voltage satisfies the V1=n−(0.25~0.15), V2=n−(0.2~0.1), and V3=n (here, 'n' is an electric potential at the full charge of the secondary battery), and V1<V2<V3, and the ratio of the first C-rate (C1): the second C-rate (C2): the third C-rate (C3) satisfies following condition (1):

$$C1:C2:C3=3.8\sim4.2:2.8\sim3.2:0.8\sim1.2 \qquad (1).$$

Here, the C-rate (Current rate) is a unit for setting current under various conditions at the charge/discharge of a battery and predicting or indicating usable time of a battery and is obtained by calculating charge/discharge current by dividing a charging current or a discharge current by rated capacity of the battery. The unit of the C-rate is C and may be defined as equation 3 below.

$$C\text{-rate }(C\text{-rate: }C)=\text{charge/discharge current/rated capacity of battery} \qquad (3)$$

As explained above, CC-CV method having been used as the conventional charging method of the secondary battery has a problem that when high current is applied to increase the charge speed, the degradation of the battery is promoted, and when lowering the charge speed, the charge amount drops. Further, when the charge method of performing CC charge by gradually changing the charge C-rate, the electric potential reaches the lithium dendrite growth potential from the initial period, or the degradation speed in the battery is not consistent due to different speed of reaching the lithium dendrite growth potential depending on the cycle, and thus the lifespan characteristic is deteriorated.

As such, the charging method according to the present invention maintains the C-rate rate by sections as consistent and sets appropriate cutoff voltage according thereto while adopting the step-by-step CC-CV charging method to thereby have a high level negative electrode potential flatness in which the difference between the maximum value and the minimum value of the negative electrode in the negative electrode potential flat section during the charge is within 0.1V, thereby maintaining the speed of reaching the lithium dendrite growth potential as cycles are continued and significantly improving the lifespan characteristic.

Here, as the charging is continued, the potential of the negative electrode by C-rates is shown as in FIG. 2 and there comes to be a section A in which the slope rapidly changes at a certain moment. At this time, the section after section A is the negative electrode potential flat section.

Furthermore, according to the present invention, since the potential of the negative electrode during one time charging of the secondary battery has a very high flatness, the potential may not reach the lithium dendrite growth potential in all sections, and thus the initial charging capacity efficiency is very high.

Meanwhile, C-rate gradually decreases at the CV-charge of the first charge section, the second charge section and the third charge section, and at this time, the lowest bounding where C-rate decreases at each section is C-rate which is set in the next charging section. Namely, the charge C-rate having reached the charge cutoff voltage at each charge section may gradually decrease to the preset C-rate of the next charge section.

Here, "gradually" means that the change has a continuous slope.

When the charging is performed with the C-rate which is set per section, the voltage increases and the upper limit voltage capable of continually supplying current by preset C-rate is the charge cutoff voltage. When such a cutoff voltage per section is set to be too low compared to C-rate, the charging time at a high C-rate becomes too short and thus the desired level of charging time reduction effect cannot be expected, and when the cutoff voltage per section is set to be too high, the charging is continued at the high C-rate and thus the potential of the negative electrode rapidly reaches the lithium reduction potential and the lithium dendrite grows on the surface of the negative electrode, thereby generating a sudden death which is a sudden short circuit. Hence, the C-rate and cutoff voltage of each section are closely associated with each other.

After repeated experiments, inventors of the present application have found that when the C-rate ratio of each section and the charging cutoff voltage thereof are set like the above, the highest-level negative electrode potential flatness and the best cycle characteristic are shown.

For example, when the full charge potential of the secondary battery is 4.4V, the charging cutoff voltage V1 may be set to between 4.15 to 4.25V, the charging cutoff voltage V2 may be set to between 4.2 to 4.3V, and the charging cutoff voltage V3 may be set to 4.4V. At this time, V1<V2<V3 should be satisfied, and thus when a specific value is set, as an example, V1 may be set to 4.2V, V2 may be set to 4.3V, and V3 may be set to 4.4.

Furthermore, in order to have the effects according to the present invention, the charging cutoff voltage should be set according to the condition, and the C-rate ratio of each section should satisfy the condition of 4:3:1 (error 20%). Specifically, it is preferred that C1:C2:C3=3.9 to 4.1:2.9 to 3.1:0.9 to 1.1, more specifically C1:C2:C3=3.95 to 4.05:2.95 to 3.05:0.95 to 1.05.

At this time, the specific value of the C-rate is determined based on the target C-rate (Ct). Here, the target C-rate is the C-rate value targeted when performing CC-VV charging by 1 step and is the C-rate value of rapid charging for reducing the charging time.

On the basis of the target C-rate (Ct) having been set based thereon, the first C-rate (C1) may be between 1.6Ct and 1.7Ct, the second C-rate (C2) may be between 1.2Ct and 1.3Ct, the third C-rate (C3) may be between 0.4Ct and 0.5Ct. Specifically, the first C-rate (C1) may be between 1.66Ct and 1.67Ct, the second C-rate (C2) may be between 1.24Ct and 1.26Ct, and the third C-rate (C3) may be between 0.41Ct and 0.42Ct. Namely, C1 may be 1.6 to 1.7 times of Ct, specifically 1.66 to 1.67 times of Ct, C2 may be 1.2 to 1.3 times of Ct, specifically 1.24 to 1.26 times of Ct, and Ct may be 0.4 to 0.05 times of Ct, specifically 0.41 to 0.42 times of Ct. Here, the ratio of C1:C2:C3 satisfies approximately 4:3:1 as explained above.

When step-by-step charge is performed with predetermined C-rate like the above, the difference between the maximum value and the minimum value of the negative electrode flat section during the charging of the secondary battery may be maintained at less than 0.15V as explained above, and thus the degradation speed of the battery according to the continuation of cycles significantly decreases, thereby having superior lifespan characteristic.

Meanwhile, the target C-rate may be substantially determined according to the client's request, but the target C-rate will substantially drop as the loading amount increases in consideration of the fact that the target C-rate is determined by the energy density per volume of the negative electrode, more accurately by the loading amount of the negative electrode, and specifically as the loading amount increases, the resistance in the negative electrode may become different and in order to have the sufficient effect of capacity increase according to the loading amount, the charge rate may drop by the rapid charge.

Namely, the target C-rate (Ct) is in inverse proportion to the amount of loading of the negative electrode, and the level may be in inverse proportion exponentially.

The secondary battery to which the charging method of the present invention is applied is not limited in its kind but specifically may be a lithium ion battery having embedded therein an electrode assembly including a positive electrode, a negative electrode, and a separator interposed between the positive electrode and the negative electrode in a battery case in a state of being impregnated with an electrolytic solution.

The positive electrode may be fabricated, for example, by applying a positive electrode active material composed of positive electrode active material particles to a positive electrode current collector, and a positive electrode material mixture containing a conductive material and a binder. Further, a filler may be further added to the positive electrode mixture.

The positive electrode current collector is generally formed with a thickness of 3 to 500 μm and is not particularly limited as long as it has high conductivity without causing chemical changes in the battery. For example, one selected from stainless steel, aluminum, nickel, titanium, and aluminum or stainless steel of which the surface has been treated with carbon, nickel, titanium or silver may be used and in detail, aluminum may be used. The current collector may have fine irregularities on the surface thereof to increase the adhesive force of the positive electrode active material, and various forms such as a film, a sheet, a foil, a net, a porous body, a foam, and a nonwoven fabric are possible.

The positive electrode active material may be composed of layered compounds such as lithium nickel oxide ($LiNiO_2$), and compounds substituted with one or more transition metals; lithium manganese oxide ($LiMnO_2$) such as $Li_{1+x}Mn_{2-x}O_4$ (here, x is between 0 and 0.33), $LiMnO_3$, $LiMn_2O_3$, $LiMnO_2$, etc.; lithium copper oxide ($Li_2CuO_2$); Vanadium oxide such as $LiV_3O_8$, $LiFe_3O_4$, $V_2O_5$, $Cu_2V_2O_7$; lithiated nickel oxide expressed as chemical formula $LiNi_{1-x}M_xO_2$ (here, M=Co, Mn, Al, Cu, Fe, Mg, B or Ga and, x=between 0.01 and 0.3); lithium manganese composite oxide expressed as chemical formula $LiMn_{2-x}M_xO_2$ (here, M=Co, Ni, Fe, Cr, Zn or Ta, x=between 0.01 and 0.1) or $Li_2Mn_3MO_8$ (here, M=Fe, Co, Ni, Cu or Zn); $LiMn_2O_4$ in which part of lithium is substituted with alkaline earth metal ions; disulfide compound; or composite oxide formed by combination thereof $Fe_2(MoO_4)_3$, but not limited to these examples.

The conductive agent is usually added in an amount of 1 to 30 wt % based on the total weight of the mixture including the positive electrode active material. Such a conductive agent is not particularly limited as long as it has electrical conductivity without causing a chemical change in the battery, and examples thereof include graphite such as natural graphite and artificial graphite; carbon black such as carbon black, acetylene black, Ketjenblack, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; conductive materials such as polyphenylene derivatives and the like.

The binder is a component which assists in bonding of the active material and the conductive material and binding with the current collector 1, and is usually added in an amount of 1 to 30 wt % based on the total weight of the mixture containing the positive electrode active material. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, Polypropylene, ethylene-propylene-diene terpolymer (EPDM), sulfonated EPDM, styrene butylene rubber, fluorine rubber, various copolymers and the like.

The negative electrode may be formed by applying a negative electrode material on the negative electrode current collector 1 and drying the negative electrode material. If necessary, the negative electrode may further include the above-described components.

The negative electrode current collector 1 is generally made to have a thickness of 3 to 500 μm. The negative electrode current collector 1 is not particularly limited as long as it has conductivity without causing chemical changes in the battery, and examples thereof include copper, stainless steel, aluminum, nickel, titanium, calcined carbon, and copper or stainless steel of which the surface has been treated with carbon, nickel, titanium, or silver, and an aluminum-cadmium alloy. In addition, like the positive electrode current collector 1, fine unevenness can be formed on the surface to enhance the bonding force of the negative electrode active material, and it can be used in various forms such as films, sheets, foils, nets, porous bodies, foams, etc.

The negative electrode active material may include carbon such as non-graphitized carbon or graphite carbon; $Li_xFe_2O_3 (0≤x≤1)$, $Li_xWO_2 (0≤x≤1)$, $Sn_xMe_{1-x}Me'_yO_z$ (Me: Mn, Fe, Pb, Ge; Me': Al, B, P, Si, Group 1, group 2, group 3 elements of the periodic table, halogen; Metal complex oxides such as $0≤x≤1$; $1≤y≤3$; $1≤z≤8$); Lithium metal; Lithium alloy; Silicon-based alloys; Tin alloy; Oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; Conductive polymer such as polyacetylene; Li—Co—Ni group material. However, specifically, as described above, since the negative electrode according to the present invention is more effective when a negative electrode uses graphite carbon as a negative electrode active material, the negative electrode may include graphite carbon as a negative electrode active material.

The separation membrane is interposed between a positive electrode and a negative electrode, and an insulating thin film having high ion permeability and mechanical strength is used. The pore diameter of the separator is generally 0.01 to 10 μm and the thickness is generally 5 to 300 μm. Examples of such a separation membrane include olefin-based polymers such as polypropylene, which is chemically resistant and hydrophobic; a sheet or a nonwoven fabric made of glass fiber, polyethylene or the like. When a solid electrolyte such as a polymer is used as the electrolyte, the solid electrolyte may also serve as a separation membrane.

The electrolyte may be a non-aqueous electrolyte containing a lithium salt, which is composed of a nonaqueous electrolyte and lithium. As the non-aqueous electrolyte, a non-aqueous electrolyte, a solid electrolyte, an inorganic solid electrolyte and the like are used, but not limited to these examples.

Examples of the nonaqueous organic solvent include N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxyfranc, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, ethyl propionate and the like.

Examples of the organic solid electrolyte include polymers such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, and an ionic dissociation group.

Examples of the inorganic solid electrolyte include Li nitrides such as $Li_3N$, $LiI$, $Li_5NI_2$, $Li_3N$—$LiI$—$LiOH$, $LiSiO_4$, $LiSiO_4$—$LiI$-$LiOH$, $Li_2SiS_3$, $Li_4SiO_4$, $Li_4SiO_4$—$LiI$-$LiOH$, $Li_3PO_4$—$Li_2S$—$SiS_2$, halides, sulfates, etc.

The lithium salt is a substance that is soluble in the non-aqueous electrolyte, and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylate lithium, lithium 4-phenylborate, imide and the like.

For the purpose of improving charge/discharge characteristics and flame retardancy, pyridine, triethylphosphite, triethanolamine, cyclic ethers, ethylenediamine, glyme, hexahydrate triamide, nitrobenzene derivatives, sulfur, quinone imine dyes, N-substituted oxazolidinones, N, N-substituted imidazolidines, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics. Further, FEC (Fluoro-Ethylene Carbonate), PRS (Propene sultone), etc. may be further included.

The battery case may be a pouch-shaped battery case made of a conventionally known laminate sheet, or a square or cylindrical can made of a metal can.

Effect of the Invention

As described above, according to the charging method of the secondary battery of the present invention, by enabling the charging C-rate and cut-off voltage for each section to satisfy specific conditions, a high level negative electrode potential flatness, in which the difference between the maximum value and the minimum value of the negative electrode potential in the negative electrode potential flat section becomes within 0.1V, can be maintained, compared with the conventional one-step CC-CV charging method or the conventional one-step charging method. As such, the cycle is proceeded, the rate of reaching the lithium dendrite growth potential can be maintained constant, thereby effectively preventing degradation of the battery, thereby remarkably improving lifetime characteristics.

DETAILED DESCRIPTION OF THE PREFERRED EMBODIMENTS

Figure 1:
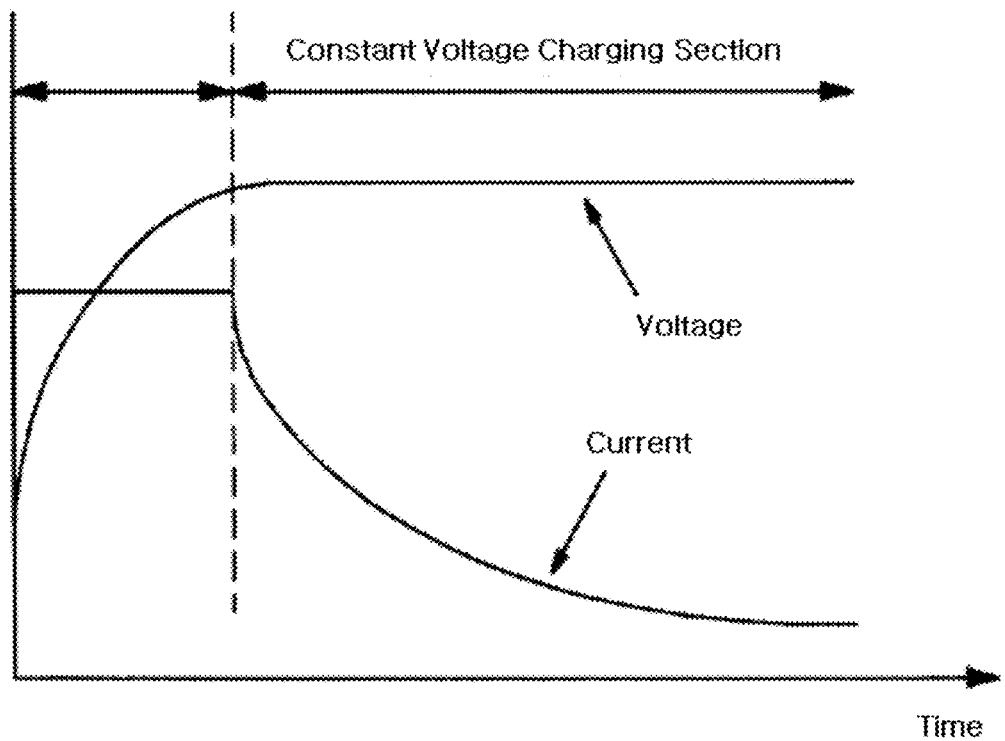
FIG. 1 is a view showing a relationship between a charging current and a charging voltage according to a CC-CV charging method of a conventional lithium secondary battery.
Figure 2:
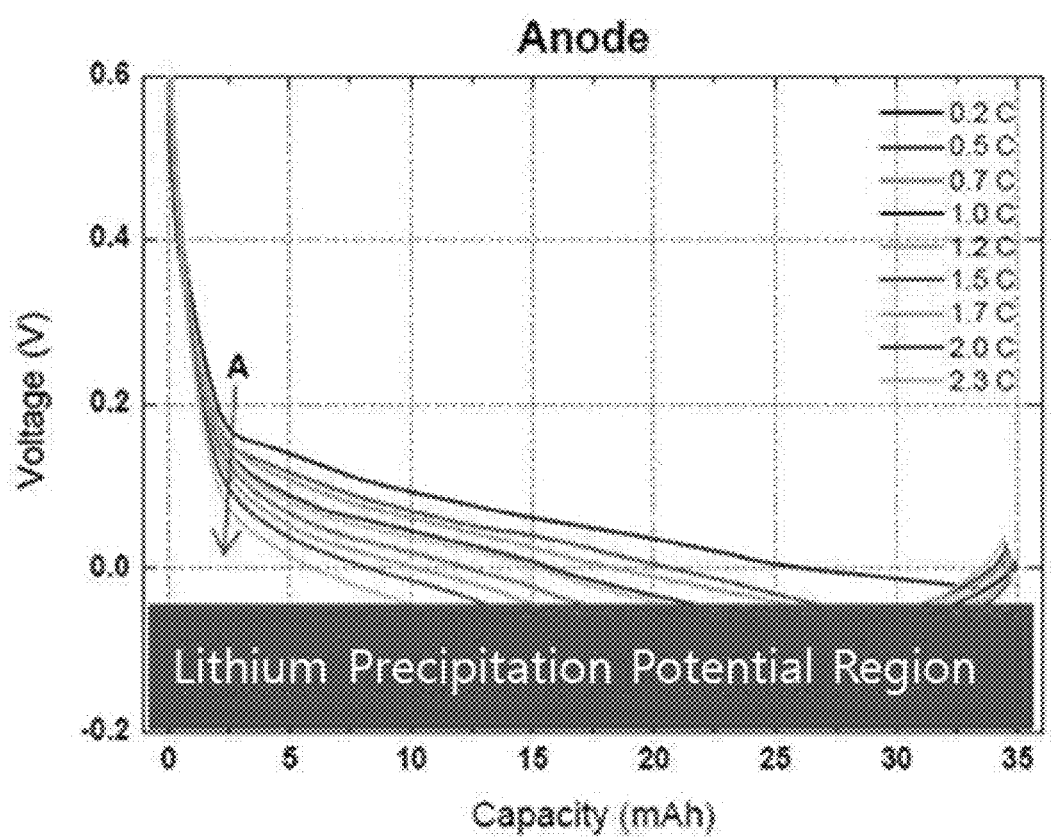
FIG. 2 is a graph showing the potential of a negative electrode according to the charging per charge C-rate.

Hereinafter, the present invention will be described more through some embodiments, but the embodiments merely illustrate the present invention and the scope of the present invention is not limited by the embodiments.

Production Example 1

A slurry was made by adding a positive electrode active material LiCoO (average diameter: 10 μm), a conductive agent (Denka black) and a binder (PDVF) with the weight ratio of 97:1:2 to N-methyl pyrrolidone (NMP). The slurry was applied on aluminum foil, dried and rolled by a roll process to thereby make a positive electrode with thickness of 147 μm.

A slurry was made by dissolving an artificial graphite (negative electrode active material), a conductive agent (Denka black), a binder (SBR) and viscosity agent (CMC) with the weight ratio of 96:1:2:1 in water, and the slurry was applied on a copper current collector, dried and rolled by a roll process to thereby make a negative electrode with the thickness of 178 μm.

The separator was respectively inserted between the positive electrode and the negative electrode, which is then wound, compressed and inserted into a pouch type battery case, and carbonate-based electrolyte is injected thereinto to thereby make a lithium secondary battery.

Production Example 2

A slurry was made by adding a positive electrode active material LiCoO (average diameter: 10 μm), a conductive agent (Denka black) and a binder (PDVF) with the weight ratio of 97:1:2 to N-methylpyrrolidone (NMP). The slurry was applied on aluminum foil, dried and rolled by a roll process to thereby make a positive electrode with thickness of 107 μm (the electrode density is the same as the production example 1).

A slurry was made by dissolving artificial graphite (negative electrode active material), conductive agent (Denka black), a binder (SBR) and viscosity agent (CMC) with the weight ratio of 96:1:2:1 in water, and the slurry was applied on a copper current collector, dried and rolled by a roll process to thereby make a negative electrode with the thickness of 121 μm (the electrode density is the same as the production example 1).

The separator was respectively inserted between the positive electrode and the negative electrode, which is then wound, compressed and inserted into a pouch type battery case, and carbonate-based electrolyte is injected thereinto to thereby make a lithium secondary battery.

Examples 1, 2, Comparative Examples 1-6

Lithium secondary batteries made with the same performance as in the production example 1 were charged under the conditions of working example 1 and comparative examples 1 to 6 of Table 1 below, and the lithium secondary battery as in the production example 2 was changed under the condition of the production example 2.

TABLE 1

| 25° C. | Charging method |
|---|---|
| Example 1 (Ct = 1.2 C) | (Cascaded CC-CV mode) 2.0 C(3.0 V~4.2 V)/4.2 V-1.5 C(4.2 V~4.3 V)/ 4.3 V-0.5 C(4.3 V~4.4 V).4.4 V |
| Example 2 (Ct = 2.0 C) | (Cascaded CC-CV mode) 3.3 C(3.0 V~4.15 V)/4.15 V-2.5 C(4.15 V~4.25 V)/ 4.25 V-0.8 C(4.3 V~4.4 V).4.4 V |
| Comparative example 1 (Ct = 1.2 C) | (Cascaded CC-CV mode) 1.2 C(3.0 V~4.2 V)/4.2 V-0.7 C(4.2 V~4.4 V)/4.4 V |
| Comparative example 2 (Ct = 1.2 C) | (Cascaded CC-CV mode) 1.2 C(3.0 V~4.2 V)/4.2 V-0.5 C(4.2 V~4.4 V)/4.4 V |
| Comparative example 3 (Ct = 1.2 C) | (Cascaded CC-CV mode) 1.5 C(3.0 V~4.2 V)/4.2 V-0.5 C(4.2 V~4.4 V)/4.4 V |
| Comparative example 4 (Ct = 1.2 C) | (Cascaded CC-CV mode) 1.5 C(3.0 V~4.2 V)/4.2 V-0.7 C(4.2 V~4.4 V)/4.4 V |
| Comparative example 5 (Ct = 1.2 C) | (CC-CV mode) 3.0 C(3.0 V~4.2 V)/4.2 V-2.0 C(4.2 V~4.3 V)/ 4.3 V-1.0 C(4.3 V~4.4 V).4.4 V |
| Comparative example 6 (Ct = 1.2 C) | (CC-CV mode) 1.2 C(3.0 V-4.4 V) |

*Ct means target C-rate.

Experiment Example 1

Figure 3:
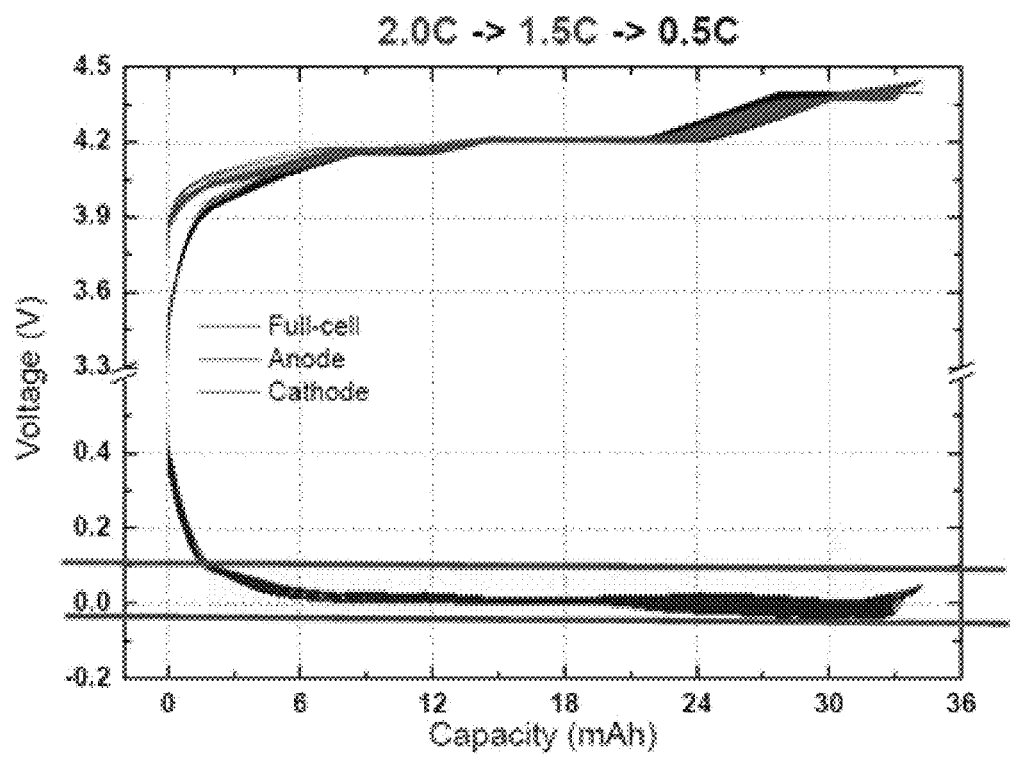
FIG. 3 is a graph showing potentials of positive and negative electrodes and the voltage of a secondary battery in a charging process of the lithium secondary battery according to a first example of the present invention.
Figure 4:
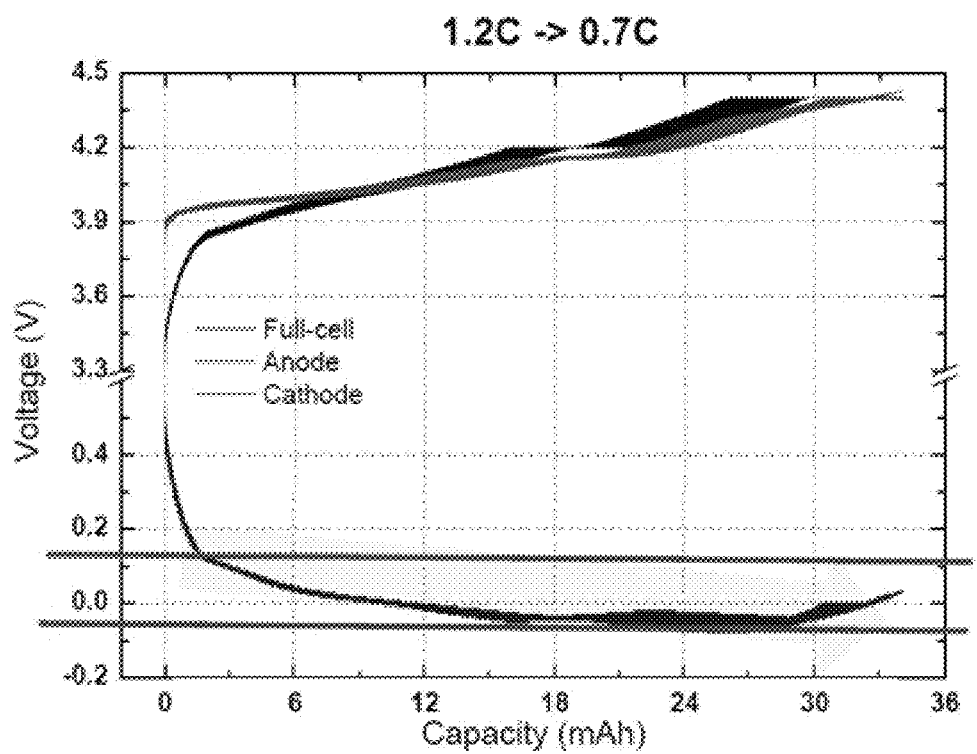
FIG. 4 is a graph showing potentials of positive and negative electrodes and the voltage of a secondary battery in a charging process of a lithium secondary battery according to a first comparative example of the present invention.
Figure 5:
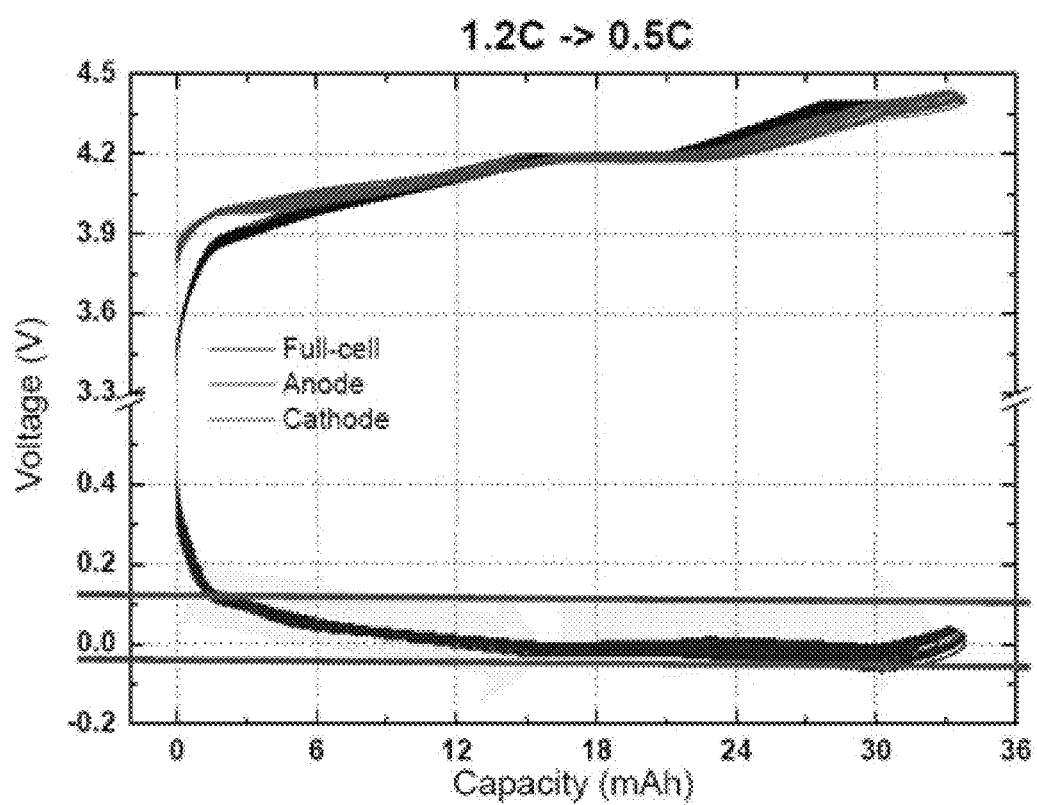
FIG. 5 is a graph showing potentials of positive and negative electrodes and the voltage of a secondary battery in a charging process of a lithium secondary battery according to a second comparative example of the present invention.
Figure 6:
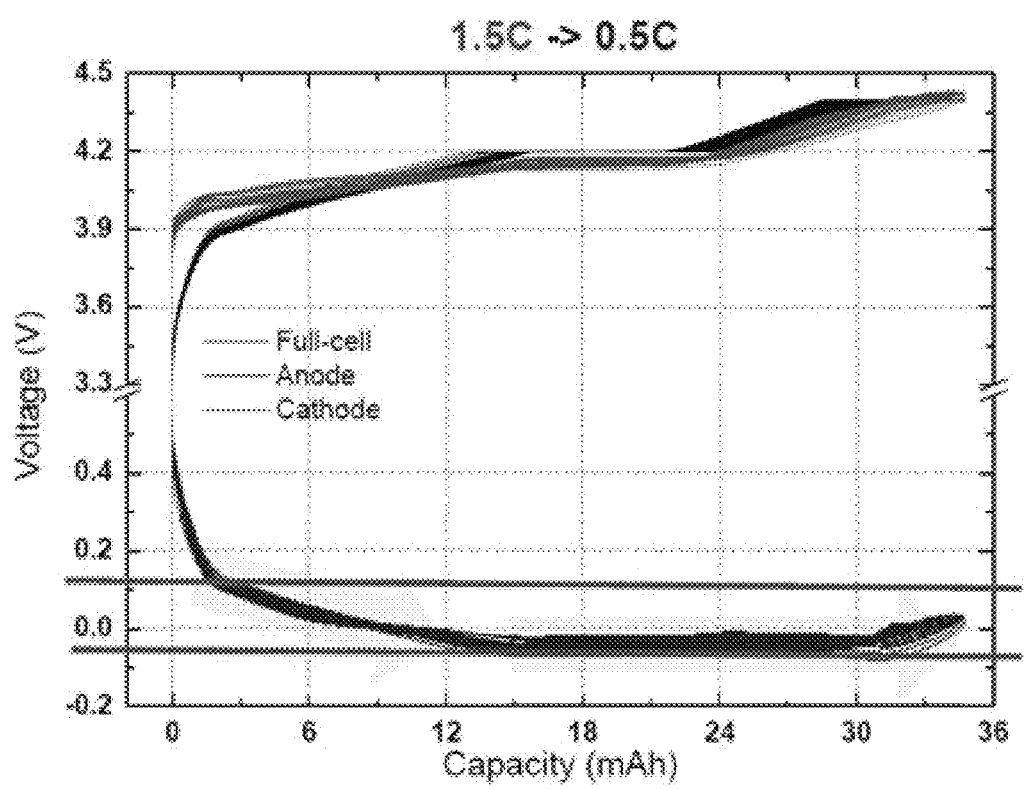
FIG. 6 is a graph showing potentials of positive and negative electrodes and the voltage of a secondary battery in a charging process of a lithium secondary battery according to a third comparative example of the present invention.
Figure 7:
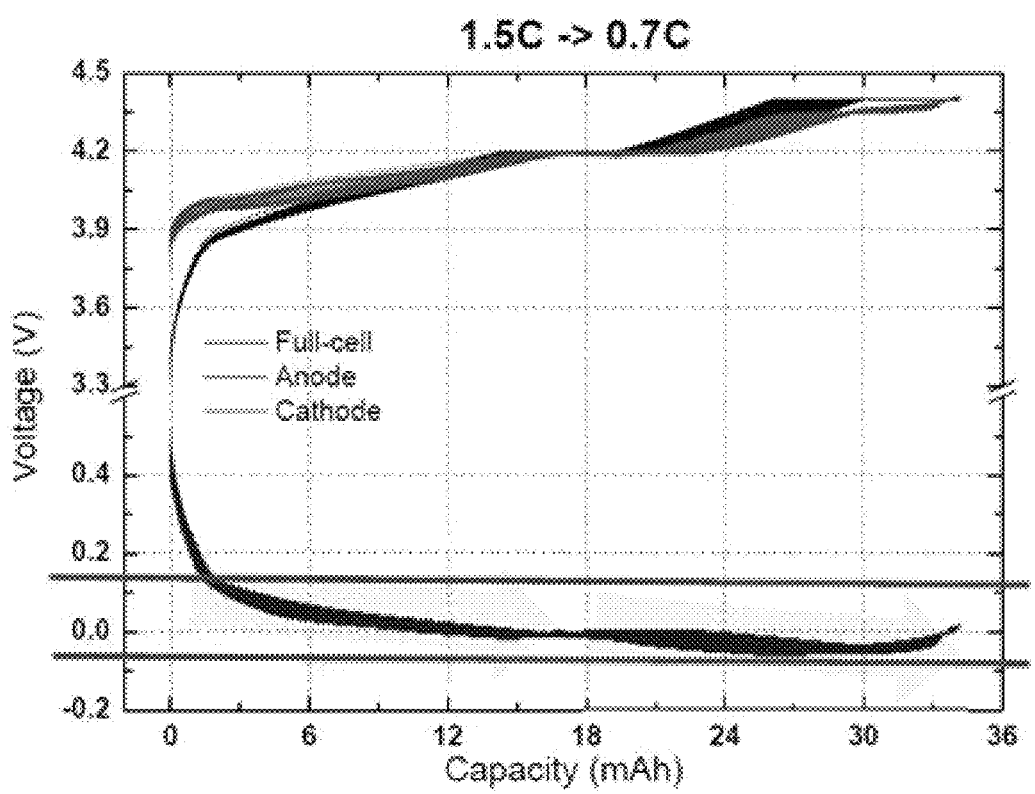
FIG. 7 is a graph showing potentials of positive and negative electrodes and the voltage of a secondary battery in a charging process of a lithium secondary battery according to a fourth comparative example of the present invention.

When charging with the methods of example 1 and comparative examples 1 to 4 of Table 1, voltage and capacity of the secondary battery and negative electrode and positive electrode until full charge are shown in FIGS. 3 to 7. In the graphs, the red lines around the negative electrode potential indicate the maximum and minimum values of the negative electrode potential.

Referring to the drawings, when charging is performed with the charging method of the example 1, the difference between the maximum value and the minimum value in the negative electrode potential flat section during the charging process is equal to or less than 0.15V, which shows a very good flatness. In contrast, when the charging methods of comparative examples 1 to 4 are used, the difference between the maximum value and the minimum value in the negative electrode potential flat section is equal to or greater than 0.15V, and thus it is shown that flatness is low compared to other examples, the difference in the negative electrode potential by sections is large, and the potential may reach the reduction potential of the negative electrode during one time charging period to thereby come to exist a section that the potential drops to a level that lithium dendrite is formed.

Likewise, when the condition of the present invention is not satisfied, the difference in the electric potential of the negative electrode is large, and thus it is expected that the degradation speed by sections may not be consistent. In contrast, when using the method of the present invention, it is expected that the electric potential of the negative electrode does not reach the lithium dendrite growth potential, and since the flatness by charging sections is good, even when the cycling increases, the degradation speed is consistent, and thus the lifespan characteristic will be good.

Experiment Example 2

Charging was performed in the condition of the above Table 1 and discharging was performed under 0.7CC condition, and 10 minute rest time was given after charging and discharging, respectively, which was repeated 800 cycles to thereby obtain charged and discharged energies and compare the energies so as to measure the state of charge (SOC) of batteries of examples 1 and 2 and comparative examples 1 to 6 and measure the time until the full charge for one cycle of each. And the result is shown in Table 2 below.

TABLE 2

| 25° C. | SOC after 800 cycles (%) | Full charge time of 1$^{st}$ cycle (min) |
|---|---|---|
| Example 1 | 92 | 92.7 |
| Example 2 | 92 | 76.0 |
| Comparative example 1 | 82 | 92.9 |
| Comparative example 2 | 92 | 106.5 |
| Comparative example 3 | 92 | 101.9 |
| Comparative example 4 | 60 | 91.5 |
| Comparative example 5 | 0 | 88.2 |
| Comparative example 6 | 0 | 86.0 |

Referring to the above Table 2, as expected from the experiment example 1, the charging by the charging method according to the present invention shows appropriate charging time and the best lifespan characteristic.

In contrast, in comparative examples 1 and 4 to 6, the SOC after the cycle is significantly low, and in comparative examples 5 and 6, the charging speed is high but the SOC after 800 cycles becomes almost 0, and thus the battery becomes unusable.

On the other hand, in comparative examples 2 and 3, the cycle characteristics are similar, but the time until the full charge is about 10 minutes which is slow.

As cycles are repeated, the negative electrode is degraded and the profile is shifted to the lower side. As shown in the comparative example 6, when CC/CV-charged, the lifespan characteristic significantly drops by reaching Li precipitation are in a high SOC area.

Likewise, in comparative examples 1 and 4, the charging time may be appropriate by first reaching Li precipitation with high C-rate (0.7C) in the high SOC area, but the lifespan characteristic is inferior. In comparative examples 2 and 3, the potential level is similar to the experiment example in a high SOC example compared to Li precipitation area but C-rate in the low SOC area is low to thereby show a high potential level compared to the experiment example, and thus the total charging speed is low. As in comparative example 5, when using the rate which is different from the rates of the experiment example, the distance with Li precipitation potential by sections is different, thereby rapidly dropping the lifespan.

Here, the SOC was evaluated by indicating the capacity after 800 cycles compared to the initial capacity as the percentage rate.

It will be understood by those skilled in the art that various changes in form and details may be made therein without departing from the spirit and scope of the invention as defined by the appended claims.

The invention claimed is:

1. A method of charging a secondary battery, including charging sections by preset C-rates, and performing a constant current-constant voltage (CC-CV) charging in each of the charging sections,
wherein the charging sections comprise:
a first charging section in which a CC-charging is performed as a first C-rate (C1) is supplied until the voltage of the secondary battery reaches a first charging cutoff voltage (V1), and a CV-charging is performed as a charging C-rate gradually decreases in response to reaching the first charging cutoff voltage (V1);
a second charging section in which a CC-charging is performed as a second C-rate (C2) is supplied until the voltage of the secondary battery reaches a second charging cutoff voltage (V2), and a CV-charging is performed as the charging C-rate gradually decreases in response to reaching the second charging cutoff voltage (V2); and
a third charging section in which a CC-charging is performed as a third C-rate (C3) is supplied until the voltage of the secondary battery reaches a third charging cutoff voltage (V3), and a CV-charging is performed as the charging C-rate gradually decreases in response to reaching the third charging cutoff voltage (V3),
wherein the charging cutoff voltage satisfies the V1=n−(0.25~0.15), V2=n−(0.2~0.1), and V3=n (here, 'n' is an electric potential at the full charge of the secondary battery), and V1<V2<V3, and
wherein C1=3.3C, C2=2.5C and C3=0.8C.

2. The method of claim 1, wherein the charge C-rate having reached the charge cutoff voltage at each charge section gradually decreases to the preset C-rate of the next charge section.

3. The method of claim 1, wherein C1, C2 and C3 are set on the basis of a target C-rate (Ct).

4. The method of claim 3, wherein the target C-rate Ct is to correspond to the constant current-constant voltage (CC-CV) charge and is determined by a loading amount of a negative electrode of the secondary battery.

5. The method of claim 4, wherein the target C-rate (Ct) is in inverse proportion to the amount of loading of the negative electrode.

6. The method of claim 5, wherein the target C-rate (Ct) is in inverse proportion to the amount of loading of the negative electrode, exponentially.

7. The method of claim 1, wherein the secondary battery is a lithium ion battery having embedded therein an electrode assembly including a positive electrode, a negative electrode, and a separator interposed between the positive electrode and the negative electrode in a battery case in a state of being impregnated with an electrolytic solution.

8. The method of claim 7, wherein the negative electrode comprises graphite carbon as a negative electrode active material.

9. The method of claim 7, wherein a potential of the negative electrode during one time charge of the secondary battery does not reach a lithium dendrite growth potential in the charging sections.

10. The method of claim 1, wherein a difference between a maximum value and a minimum value of a negative electrode flat section during the charging of the secondary battery is maintained at less than 0.15V.

11. A method of charging a secondary battery, including charging sections by preset C-rates, and performing a constant current-constant voltage (CC-CV) charging in each of the charging sections,
wherein the charging sections comprise:
a first charging section in which a CC-charging is performed as a first C-rate (C1) is supplied until the voltage of the secondary battery reaches a first charging cutoff voltage (V1), and a CV-charging is performed as a charging C-rate gradually decreases in response to reaching the first charging cutoff voltage (V1);
a second charging section in which a CC-charging is performed as a second C-rate (C2) is supplied until the voltage of the secondary battery reaches a second charging cutoff voltage (V2), and a CV-charging is performed as the charging C-rate gradually decreases in response to reaching the second charging cutoff voltage (V2); and
a third charging section in which a CC-charging is performed as a third C-rate (C3) is supplied until the voltage of the secondary battery reaches a third charging cutoff voltage (V3), and a CV-charging is performed as the charging C-rate gradually decreases in response to reaching the third charging cutoff voltage (V3),
wherein the charging cutoff voltage satisfies the V1=n−(0.25~0.15), V2=n−(0.2~0.1), and V3=n (here, 'n' is an electric potential at the full charge of the secondary battery), and V1<V2<V3, and
wherein C1=2.0C, C2=1.5C and C3=0.5C.

12. The method of claim 11, wherein the charge C-rate having reached the charge cutoff voltage at each charge section gradually decreases to the preset C-rate of the next charge section.

13. The method of claim 11, wherein C1, C2 and C3 are set on the basis of a target C-rate.

14. The method of claim 13, wherein the target C-rate Ct is set to correspond to the constant current-constant voltage (CC-CV) charge and is determined by a loading amount of a negative electrode of the secondary battery.

15. The method of claim 14, wherein the target Crate (Ct) is in inverse proportion to the amount of loading of the negative electrode.

16. The method of claim 15, wherein the target Crate (Ct) is in inverse proportion to the amount of loading of the negative electrode, exponentially.

17. The method of claim 11, wherein the secondary battery is a lithium ion battery having embedded therein an electrode assembly including a positive electrode, a negative electrode, and a separator interposed between the positive electrode and the negative electrode in a battery case in a state of being impregnated with an electrolytic solution.

18. The method of claim 17, wherein the negative electrode comprises graphite carbon as a negative electrode active material.

19. The method of claim 17, wherein a potential of the negative electrode during one time charge of the secondary battery does not reach a lithium dendrite growth potential in the charging sections.

20. The method of claim 1, wherein a difference between a maximum value and a minimum value of a negative electrode flat section during the charging of the secondary battery is maintained at less than 0.15V.

* * * * *